(12) United States Patent
Yan et al.

(10) Patent No.: US 12,549,936 B2
(45) Date of Patent: Feb. 10, 2026

(54) SYSTEMS AND METHODS TO OPTIMIZE REGISTRATION AND SESSION ESTABLISHMENT IN A WIRELESS NETWORK

(71) Applicant: Verizon Patent and Licensing Inc., Basking Ridge, NJ (US)

(72) Inventors: Lixia Yan, Basking Ridge, NJ (US); James Mathison, Greer, SC (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 628 days.

(21) Appl. No.: 17/517,500

(22) Filed: Nov. 2, 2021

(65) Prior Publication Data

US 2023/0137283 A1    May 4, 2023

(51) Int. Cl.
*H04W 8/18* (2009.01)
*H04W 4/24* (2024.01)
(Continued)

(52) U.S. Cl.
CPC ............ *H04W 8/18* (2013.01); *H04W 4/24* (2013.01); *H04W 48/18* (2013.01); *H04W 60/04* (2013.01); *H04W 76/10* (2018.02)

(58) Field of Classification Search
CPC ......... H04W 8/18; H04W 76/10; H04W 4/24; H04W 48/18; H04W 60/04; H04W 76/12; H04W 8/20; H04W 84/042; H04W 12/06; H04W 16/02; H04W 28/24; H04W 4/08; H04W 60/00; H04W 8/22; H04L 12/1407; H04L 12/1403; H04L 12/14; H04L 61/4541; H04L 67/51; H04L 63/08; H04L 41/0893; H04L 41/5051; H04L 63/10; H04L 67/02; H04L 67/12; H04L 67/55; H04L 67/567; H04L 69/22; H04M 15/66; H04M 15/64; H04M 15/65; H04M 15/00; H04M 15/41; H04M 15/44; H04M 15/8038; H04M 15/8228; H04M 15/88;
(Continued)

(56) References Cited

U.S. PATENT DOCUMENTS

| 2007/0192706 A1* | 8/2007 | Bruce ................. G06F 16/9574 |
| | | 709/227 |
| 2016/0314211 A1* | 10/2016 | Kerai ....................... H04L 63/10 |

(Continued)

FOREIGN PATENT DOCUMENTS

| CN | 112312339 A | * | 2/2021 | ............. H04L 12/14 |
| CN | 113067906 A | * | 7/2021 | ......... H04L 61/1541 |

(Continued)

Primary Examiner — Matthew C Sams

(57) ABSTRACT

A user equipment (UE) device may include a processor configured to receive a request associated with a user equipment (UE) device and obtain subscription information associated with the UE device from a subscription management device, wherein the subscription information includes a charging function (CHF) group identifier associated with the UE device, in response to receiving the request. The processor may be further configured to select a CHF for the UE device based on the CHF group identifier and send a message associated with the request to the selected CHF.

20 Claims, 9 Drawing Sheets

(51) Int. Cl.
*H04W 48/18* (2009.01)
*H04W 60/04* (2009.01)
*H04W 76/10* (2018.01)

(58) Field of Classification Search
CPC ............. H04M 15/59; H04M 15/8033; H04M 15/8214; H04M 15/85; H04M 15/851; H04M 15/854; G06F 16/9574; G06F 21/30; G06F 21/45; G06F 21/62; G06F 21/6218; G06F 21/6227
See application file for complete search history.

(56) References Cited

U.S. PATENT DOCUMENTS

| | | | |
|---|---|---|---|
| 2020/0092424 A1* | 3/2020 | Qiao | H04L 12/1407 |
| 2020/0145538 A1* | 5/2020 | Qiao | H04M 15/85 |
| 2020/0267786 A1* | 8/2020 | Qiao | H04W 4/24 |
| 2021/0368306 A1* | 11/2021 | Garcia Azorero | H04M 15/66 |
| 2022/0322053 A1* | 10/2022 | Das | H04L 41/0893 |
| 2023/0057651 A1* | 2/2023 | Kuravangi-Thammaiah | H04W 60/00 |

FOREIGN PATENT DOCUMENTS

| | | | | |
|---|---|---|---|---|
| CN | 116418654 A | * | 7/2023 | ......... H04L 41/0654 |
| CN | 113067906 B | * | 10/2023 | ......... H04L 61/1541 |
| WO | WO-2020156685 A1 | * | 8/2020 | ......... H04L 12/1403 |

* cited by examiner

SYSTEMS AND METHODS TO OPTIMIZE REGISTRATION AND SESSION ESTABLISHMENT IN A WIRELESS NETWORK

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. A wireless access network may manage a large number of user devices. When processing a request from a user device, a provider network may need to exchange a large number of messages between various components of the provider network. Managing messages between a large number of components of a network poses various challenges.

DETAILED DESCRIPTION OF EMBODIMENTS

Figure 1:
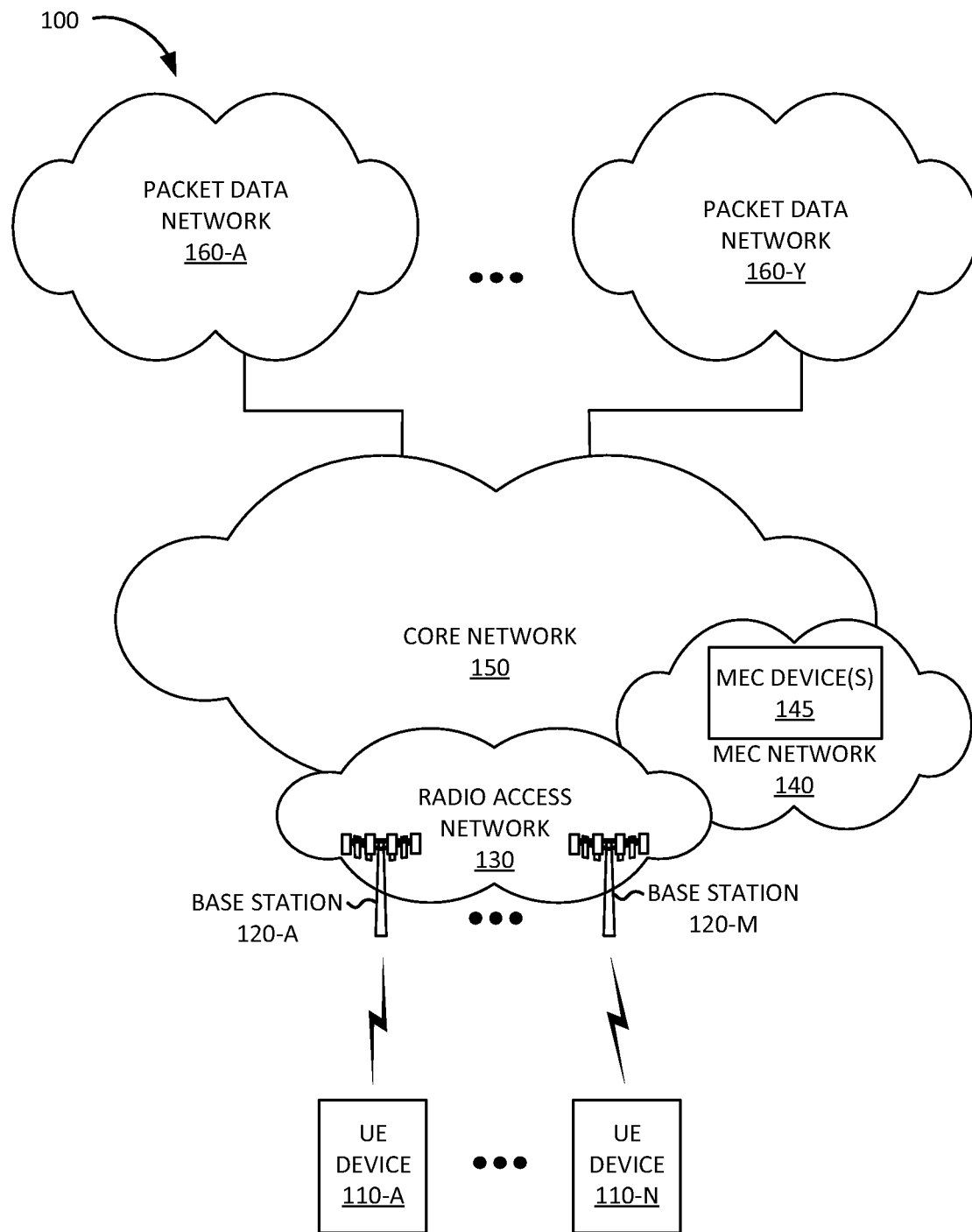
FIG. 1 illustrates an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless networks are continuing to become more complicated is by incorporating various aspects of next generation networks, such as $5^{th}$ generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in higher bandwidth and/or lower latency over other wireless network technology. Additionally, a 5G core network supports and manages 5G radio access networks (RAN) that include base stations, providing various services and enabling connections to other networks (e.g., connections to the Internet, etc.). As an example, a 5G core network may provide support for enhanced Mobile Broadband (eMBB), ultra reliable low latency communication (URLLC), massive Machine Type Communication (mMTC), and/or other types of communications.

In order to manage a RAN, provide connectivity to other networks, and/or enable various communication services for user equipment (UE) devices connected to the core network via a RAN, a 5G core network may include various network nodes, known as network functions (NFs). An important NF in a 5G core network is the Network Repository Function (NRF). An NRF may provide NF registration, management, discovery, and/or authentication services within the 5G core. For example, when a new NF, such as, for example, an Access and Mobility Management Function (AMF) is brought online, the AMF may register its reachability and services information with the NRF so that other NFs in the 5G core network are able to communicate with the AMF. Thus, when a first NF needs to communicate with a second NF in the core network, the first NF may perform a discovery process by requesting a list of available instances of the second NF type from the NRF.

Another important NF in a 5G core network is the Charging Function (CHF). The CHF may perform charging and/or billing functions for a core network. Furthermore, during a registration and Packet Data Unit (PDU) session setup procedure, NFs in the core network may have to perform an account authentication and authorization procedure with the CHF. In order to find an appropriate CHF to communicate with during registration or a PDU session setup procedure, an NF may need to perform a discovery procedure (herein referred to as an NRF discovery procedure or simply a discovery procedure) to find the CHF. The NRF discovery procedure for each registration and/or a PDU session setup procedure may result in exchanges of a large number of signals in the core network and may result in a delay during a PDU session setup.

Implementations described herein relate to systems and method to optimize registration and session establishment in a wireless network by reducing the signaling and latency of CHF discovery. A Unified Data Management (UDM) function, and/or a User Data Repository (UDR), may store subscription information for UE devices and the subscription information may include a CHF group identifier (ID). The CHF group ID may be assigned to the UE device during a subscription activation process and provided to the UDM and/or UDR. The CHF group ID may be selected based on a provider associated with the UE device, a type of subscription associated with the UE device, a location associated with the UE device, a customer account associated with the UE device, a network slice associated with the UE device, and/or another type of criterion.

The system described herein my initiate processes that are associated with using a CHF group ID for a UE device. A computer device that includes an NF may be configured to receive a request associated with a UE device. The request may include, for example, a registration request received by an AMF. As another example, the request may be associated with a PDU session establishment request and received by a Session Management Function (SMF). As yet another example, the request may be associated with a PDU session establishment request and received by a Policy Control Function (PCF).

The NF (e.g., AMF, SMF, PCF, etc.) may be further configured to, in response to receiving the request, obtain subscription information associated with the UE device from a UDM and/or a UDR. The obtained subscription information may include the CHF group ID associated with the UE device. The NF may then select a CHF for the UE device based on the CHF group ID and send a message associated with the request to the selected CHF, such as an account authentication and authorization request, a charging data message, a spending limit status message, and/or another type of message that the CHF is configured to process.

The NF may select the CHF by accessing a cache that relates CHF group IDs to particular CHF instances and identifying the selected CHF in the cache based on the CHF group ID. If the NF is able to identify a CHF instance corresponding to the CHF group ID in the cache, and the cache entry has not expired, the NF may select the CHF for the UE device based on the CHF group ID without performing NRF discovery.

If the NF determines that an entry associated with the CHF group ID does not exist in the cache or has expired, the NF may perform NRF discovery to identify a CHF associated with the CHF group ID. The NF may obtain one or more CHF instances from the NRF that correspond to the CHF group ID associated with the UE device. The NF may then store the obtained one or more CHF instances in the cache and may select a CHF instance for processing the request associated with the UE device.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, MEC network 140 (which includes MEC devices 145), core network 150, and packet data networks (PDNs) 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for IoT applications.

RAN 130 may include base stations 120. Base station 120 may be configured for one or more Radio Access Technology (RAT) types. For example, base station 120 may include a 5G NR base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices 110 using a 5G NR air interface, a 4G LTE air interface, and/or using another type of cellular air interface. Base station 120 may enable UE device 110 to communicate with core network 150.

MEC network 140 may be associated with one or more base stations 120 and may provide MEC services for UE devices 110 attached to the base stations 120. MEC network 140 may be in proximity to base stations 120 from a geographic and network topology perspective, thus enabling low latency communication with UE devices 110 and/or base stations 120. As an example, MEC network 140 may be located on the same site as base station 120. As another example, MEC network 140 may be geographically closer to base station 120, and reachable via fewer network hops and/or fewer switches, than other base stations 120.

MEC network 140 may include one or more MEC devices 145 (also referred to herein as "MEC server devices 145"). MEC devices 145 may provide MEC services to UE devices 110. A MEC service may include, for example, low-latency microservices associated with a particular application, such as, for example, user authentication microservices, navigation microservices, an online shopping microservices, content delivery microservices, gaming microservices, virtual and/or augmented reality microservices, health monitoring microservices, and/or another type of microservices associated with a low latency requirement. As another example, a MEC service may include a microservice associated with a virtualized network function (VNF) of core network 150. As yet another example, a MEC service may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphics information and/or other types of parallel processing, and/or other types of cloud computing services.

Core network 150 may be managed by a provider of cellular wireless communication services and may manage communication sessions of subscribers connecting and/or connected to core network 150 via RAN 130. For example, core network 150 may establish an Internet Protocol (IP) connection between UE devices 110 and PDN 160. Core network 150 may include a 5G core network. Exemplary components of a 5G core network are described below with reference to FIG. 2. The components of core network 150 may be implemented as dedicated hardware components or as virtualized functions implemented on top of a common shared physical infrastructure using Software Defined Networking (SDN). For example, an SDN controller may implement one or more of the components of core network 150 using an adapter implementing a VNF virtual machine, a Cloud Native Function (CNF) container, an event driven serverless architecture interface, and/or another type of SDN component. The common shared physical infrastructure may be implemented using one or more devices 300 described below with reference to FIG. 3 in a cloud computing center associated with core network 150. Additionally, or alternatively, some, or all, of the shared physical infrastructure may be implemented using one or more devices 300 implemented in MEC device 145 in MEC network 140.

PDNs 160-A to 160-Y may each be associated with a Data Network Name (DNN) and a UE device may request a connection to PDN 160 using the DNN or APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
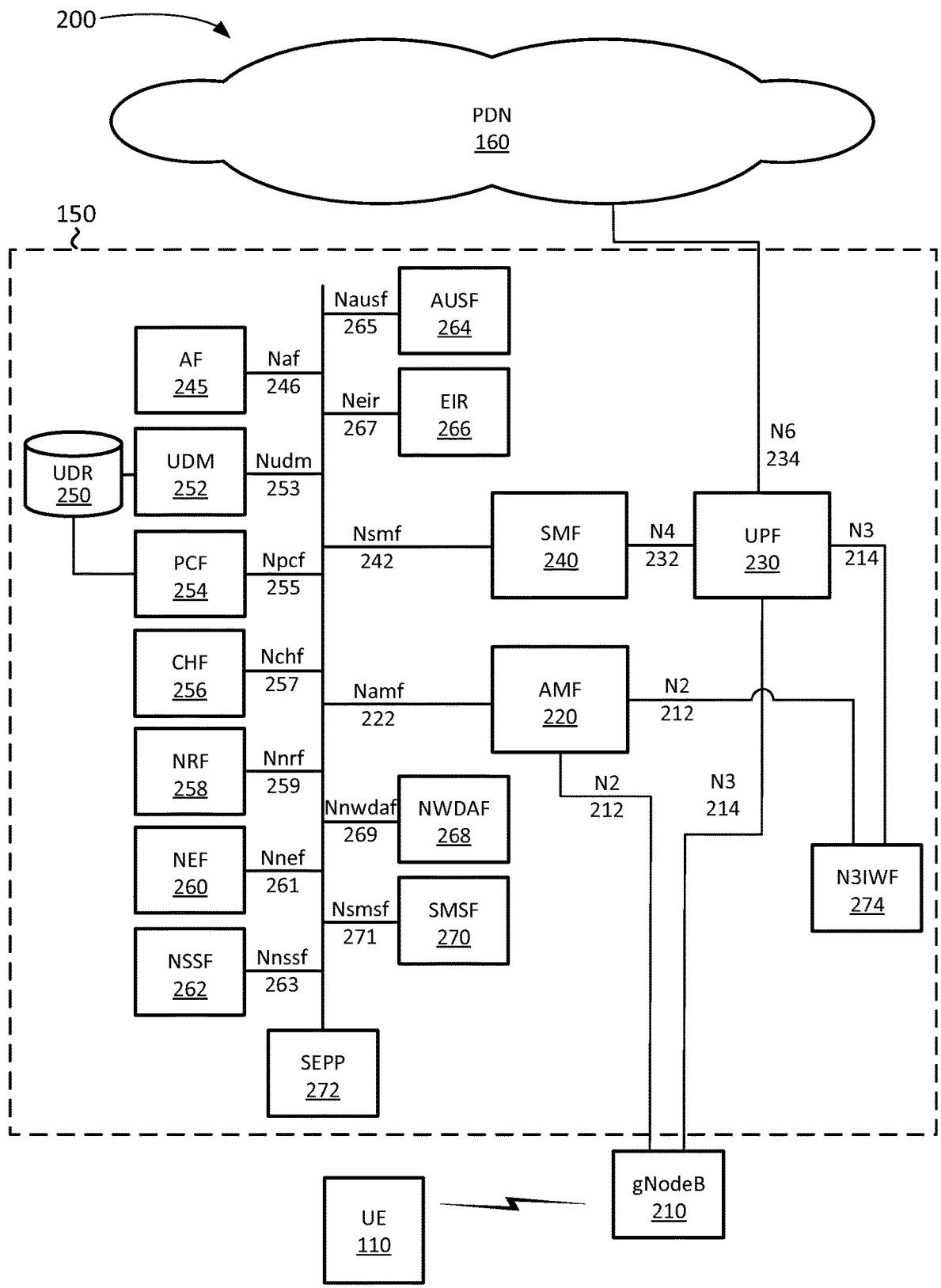
FIG. 2 is a diagram illustrating exemplary components of a Fifth Generation (5G) core network according to an implementation described herein.

FIG. 2 illustrates a system 200 that includes exemplary components of core network 150 in the context of environment 100 according to an implementation described herein. As shown in FIG. 2, system 200 may include UE device 110, gNodeB 210, core network 150, and PDN 160.

gNodeB 210 (corresponding to base station 120) may include devices (e.g., base stations) and components that enable UE device 110 to connect to core network 150 via RAN 130 using 5G NR Radio Access Technology (RAT). For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214.

Core network 150 may include an AMF 220, a User Plane Function (UPF) 230, an SMF 240, an Application Function (AF) 245, a UDR 250, a UDM 252, a PCF 254, a CHF 256, an NRF 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 245, UDR 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 150 may include multiple AMFs 220, UPFs 230, SMFs 240, AFs 245, UDRs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

AMF 220 may perform registration management, connection management, reachability management, mobility management, lawful intercepts, Short Message Service (SMS) transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external PDU point of interconnect to a particular data network (e.g., PDN 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 245 may provide services associated with a particular application, such as, for example, an application for influencing traffic routing, an application for accessing NEF 260, an application for interacting with a policy framework for policy control, and/or other types of applications. AF 245 may be accessible via an Naf interface 246, also referred to as an NG5 interface.

UDR 250 may store subscription information for UE devices 110. UDM 252 may function as an interface to UDR 250, maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. Furthermore, UDM 252 may store CHF group IDs for particular subscriptions. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. PCF 254 may interface directly with UDR 250.

CHF 256 may perform charging and/or billing functions for core network 150. For example, CHF 256 may perform account authentication and authorization for UE device 110, generate a charging record for UE device 110 based on data flow information associated with UE device 110. CHF 256 may be accessible via Nchf interface 257. CHF 256 may receive data flow information from UPF 230 via SMF 240. Furthermore, CHF 256 may receive policy information relating to policies applied to data flows associated with UE device 110 from PCF 254.

NRF 258 may support a service discovery function and maintain profiles of available network function (NF) instances and their supported services. An NF profile may include, for example, an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. NRF 258 may be accessible via an Nnrf interface 259.

NEF 260 may expose capabilities and events to other NFs, including third party NFs, AFs, edge computing NFs, and/or other types of NFs. Furthermore, NEF 260 may secure provisioning of information from external applications to core network 150, translate information between core network 150 and devices/networks external to core network 150, support a Packet Flow Description (PFD) function, and/or perform other types of network exposure functions. NEF 260 may be accessible via Nnef interface 261.

NSSF 262 may select a set of network slice instances to serve a particular UE device 110, determine network slice ID, such as, for example, network slice selection assistance information (NSSAI), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via Neir interface 267.

NWDAF 268 may collect analytics information associated with radio access network 120 and/or core network 150. SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi Access Point. N3IWF 274 may facilitate handovers for UE device 110 between radio access network 120 and the non-3GPP access device. N3IWF 274 maybe accessible via Nn3iwf interface 275.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150. For example, core network 150 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 150 may include a reference point architecture that includes point-to-point interfaces between particular function nodes.

Figure 3:
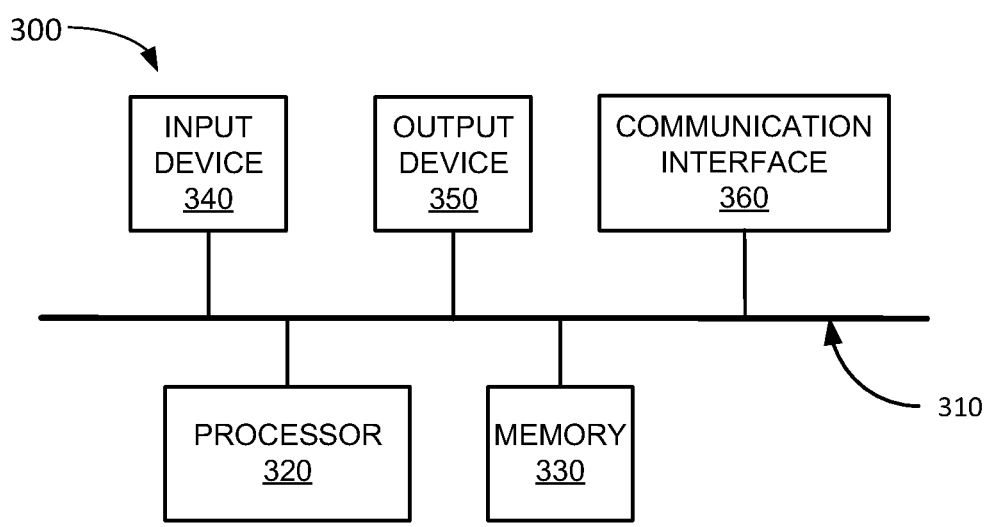
FIG. 3 is a diagram illustrating exemplary components of a device that may be included in a component of an environment and/or 5G core network according to an implementation described herein.

FIG. 3 illustrates example components of a device 300 according to an implementation described herein. UE device 110, MEC device 145, gNodeB 210, AMF 220, UPF 230, SMF 240, AF 245, UDR 250, UDM 252, PCF 254, CHF 256, NRF 258, NEF 260, NSSF 262, AUSF 264, EIR 266, NWDAF 268, SMSF 270, SEPP 272, N3IWF 274, and/or other components of core network 150, may each include and/or run on one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to selection of a CHF. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
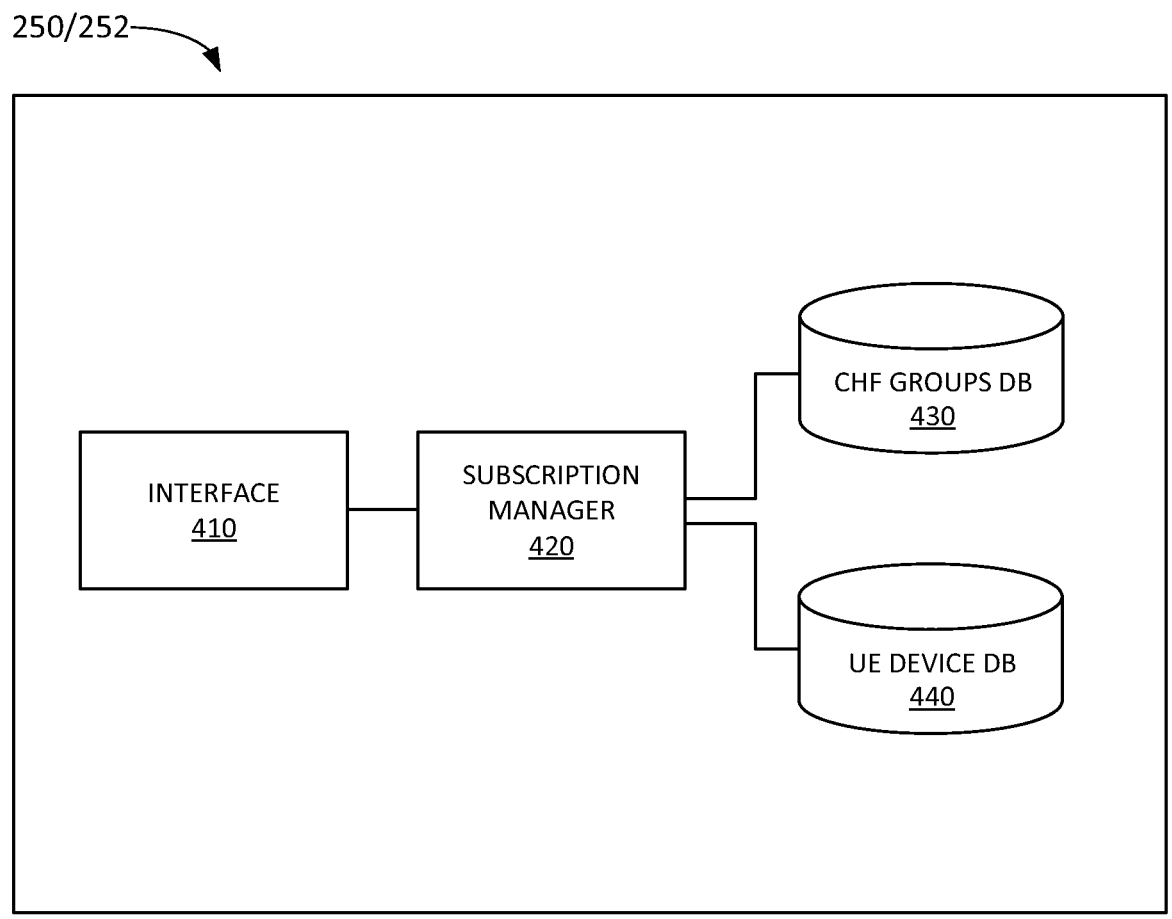
FIG. 4 is a diagram illustrating exemplary components of a Unified Data Management (UDM) component and/or a User Data Repository (UDR) according to an implementation described herein.

FIG. 4 is a diagram illustrating exemplary components of UDR 250 and/or UDM 252. The components of UDR 250 and/or UDM 252 may be implemented, for example, via processor 320 executing instructions from memory 330. Alternatively, some or all of the components of UDR 250 and/or UDM 252 may be implemented via hard-wired circuitry. As shown in FIG. 4, UDR 250 and/or UDM 252 may include an interface 410, a subscription manager 420, a CHF groups database (DB) 430, and a UE device DB 440.

Interface 410 may implement Nudm interface 253 to enable other NFs to communicate with UDM 252 and request subscription information for UE devices 110. Alternatively, in UDR 250, interface 410 may implement an interface to enable PCF 24 to interface with UDR 250. Subscription manager 420 may manage subscription information for UE devices 110. For example, subscription manager 420 may receive subscription information for UE device 110 from an ordering system, when a subscription is generated and/or activated, and store the subscription information in UE device DB 440. Furthermore, subscription manager 420 may respond to requests for subscription information for particular UE devices 110 from other NFs in core network 150 and provide the requested subscription information to the other NFs via interface 410.

Subscription manager 420 may store a CHF group ID for UE device 110 in UE device DB 440. In some implementations, a CHF group ID for UE device 110 may be received from an ordering or provisioning system when a subscription for UE device 110 is generated or activated. Thus, the CHF group ID for UE device 110 may be selected by the ordering or provisioning system. In other implementations, subscription manager 420 may select a CHF group ID for UE device 110 based on subscription information associated with UE device 110 and based on information stored in CHF groups DB 430. In such implementations, CHF groups DB 430 may store information associating particular CHF group IDs with particular subscription criteria. For example, CHF groups DB 430 may relate a CHF group ID to a provider associated with UE device 110, a type of subscription associated with UE device 110, a location associated with UE device 110, a customer account associated with UE device 110, a network slice associated with UE device 110, and/or another type of criterion. In some implementations, UE device DB 440 may be part of UDM 252. In other implementations, UE device DB 440 may be part of UDR 250.

Although FIG. 4 shows exemplary components of UDR 250 and/or UDM 252, in other implementations, system 500 may include fewer components, different components, additional components, or differently arranged components than depicted in FIG. 4. Additionally, or alternatively, one or more components of UDR 250 and/or UDM 252 may perform one or more tasks described as being performed by one or more other components of UDR 250 and/or UDM 252.

Figure 5:
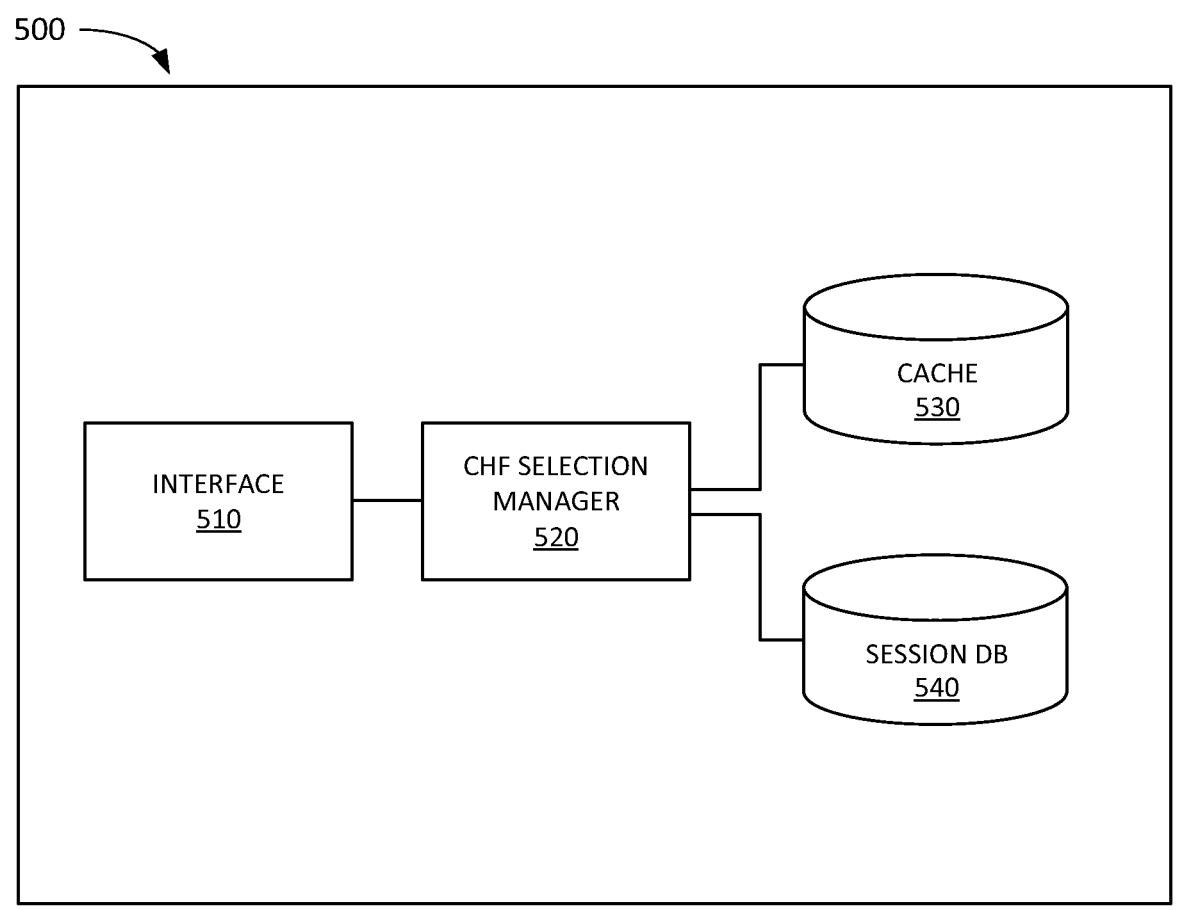
FIG. 5 is a diagram illustrating exemplary components of a network function (NF) component according to an implementation described herein.

FIG. 5 is a diagram illustrating exemplary components of an NF 500. NF 500 may correspond to AMF 220, SMF 240, PCF 254, and/or another type of NF in core network 150. The components of NF 500 may be implemented, for example, via processor 320 executing instructions from memory 330. Alternatively, some or all of the components of NF 500 may be implemented via hard-wired circuitry. As shown in FIG. 5, NF 500 may include an interface 510, a CHF selection manager 520, a cache 530, and a session DB 540.

Interface 510 may implement a 5G NF interface to enable other NFs to communicate with NF 500. CHF selection manager 520 may select a CHF instance for UE device 110 based on information stored in cache 530 or based on performing a discovery procedure with NRF 28 if an unexpired entry in cache 530 is not identified for a CHF group ID associated with UE device 110. As an example, AMF 220 may select an instance of CHF 256 for UE device 110 during registration. As another example, SMF 240 may select an instance CHF 256 for UE device 110 during a PDU session setup. As yet another example, PCF 254 may select an instance CHF 256 for UE device 110 during a PDU session setup.

Cache 530 may store a set of CHF group IDs and corresponding CHF instance IDs. For example, for each CHF group ID, cache 530 may either include no entry for a CHF instance (if no CHF instance has been identified for the CHF group ID), one or more unexpired entries for CHF instances, or one or more expired entries for CHF instances. When CHF selection manager 520 performs an NRF discovery to identify a CHF instance, CHF selection manager 520 may receive information identifying a CHF instance (e.g., a Uniform Resource Location (URL) for the CHF instance, etc.) and a CHF group ID associated with the CHF instance. CHF selection manager 520 may store the information identifying the CHF instance in cache 530 in association with the CHF group ID and may set a timer for the entry. When the timer expires, the entry for the CHF instance may be designated as an expired entry and may no longer be considered valid. Session DB 540 may store information associated with active PDU sessions. For a particular PDU session, session DB 540 may include information identifying an instance of CHF 256 that has been selected for the particular PDU session.

Although FIG. 5 shows exemplary components of NF 500, in other implementations, NF 500 may include fewer components, different components, additional components, or differently arranged components than depicted in FIG. 5. Additionally, or alternatively, one or more components of NF 500 may perform one or more tasks described as being performed by one or more other components of NF 500.

Figure 6:
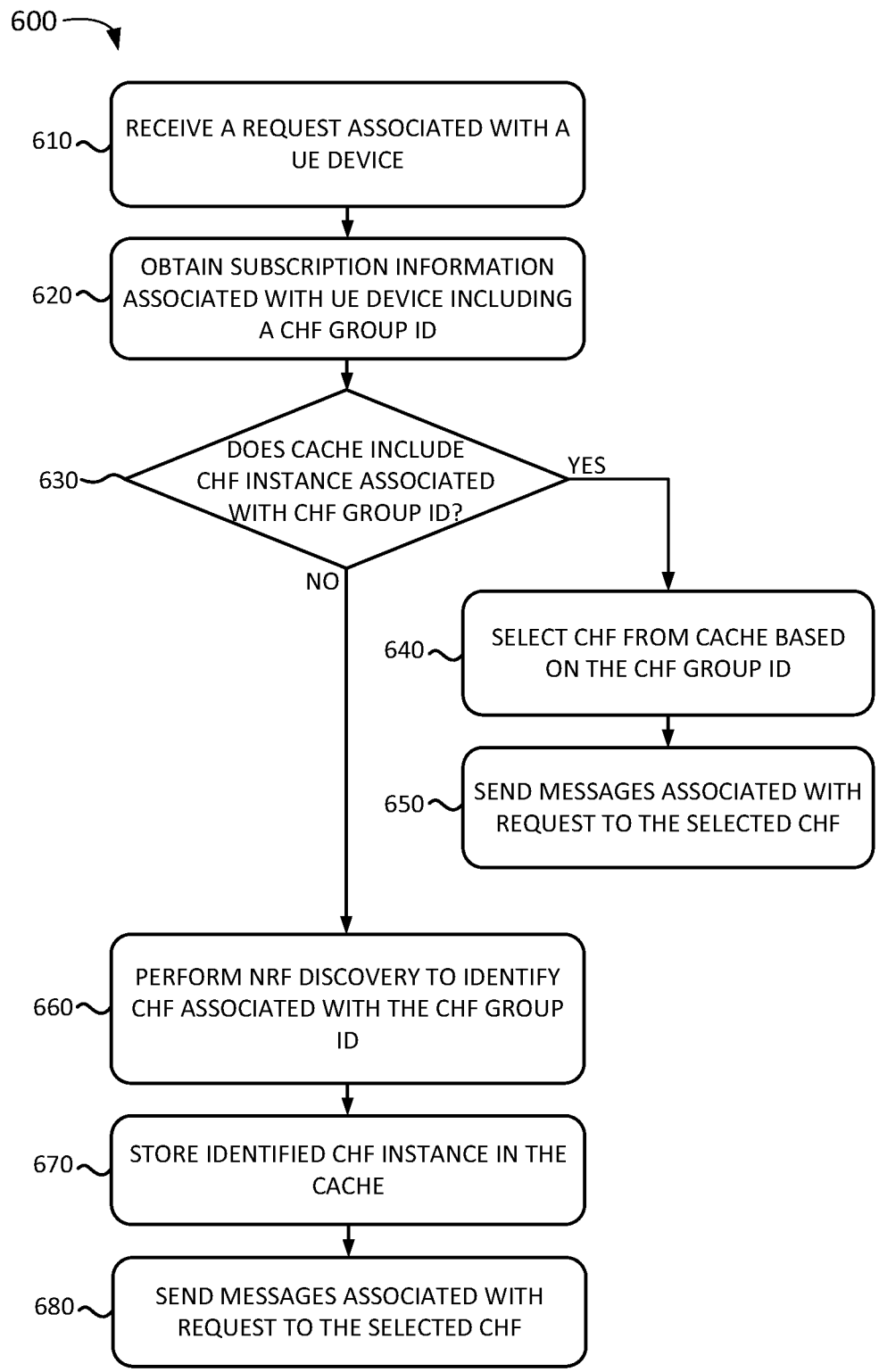
FIG. 6 illustrates a flowchart for selecting a charging function (CHF) according to an implementation described herein.

FIG. 6 illustrates a flowchart of a process 600 for selecting a CHF according to an implementation described herein. In some implementations, process 600 of FIG. 6 may be performed by AMF 220, SMF 240, PCF 254, and/or another component in core network 150. In other implementations, some or all of process 600 may be performed by another component, device, or a group of devices separate from AMF 220, SMF 240, and/or PCF 254.

As shown in FIG. 6, process 600 may include receiving a request associated with UE device 110 (block 610). As an example, AMF 220 may receive a registration request from UE device 101. As another example, SMF 240 may receive a session management context create data request from AMF 220 for a PDU session being setup. As yet another example, PCF 254 may receive a policies request from SMF 240 for a PDU session being setup. Process 600 may further include obtaining subscription information associated with UE device 110, including a CHF group ID (block 620). For example, in response to receiving the request, AMF 220, SMF 240, and/or PCF 254 may obtain subscription information, for UE device 110 associated with the request, from UDR 250 and/or UDM 252. The subscription request may include a CHF group ID for UE device 110.

A determination may be made as to whether a cache includes a CHF instance associated with the CHF group ID (block 630). For example, AMF 220, SMF 240, and/or PCF 254 may access cache 530 and determine whether an entry for the CHF group ID includes information identifying an instance of CHF 256 and is associated with a timer that has not yet expired. If it is determined that the cache does include information identifying a CHF instance associated with the CHF group ID (block 630—YES), the CHF instance identified in the cache may be selected based on the CHF group ID (block 640) and messages associated with the request may be sent to the selected CHF (block 650). As an example, AMF 220 may not need to perform NRF discovery to select a CHF for a registration request and may perform account authentication and authorization for UE device 110 with CHF 256 during the registration. As another example, SMF 240 may 220 may not need to perform NRF discovery to select a CHF for a PDU session setup process and may exchange spending context limit messages with CHF 256 for the PDU session being set up. As yet another example, PCF 254 may not need to perform NRF discovery to select a CHF for a PDU session setup process and may exchange charging data messages with CHF 256 for the PDU session being set up.

Returning to block 630, if it is determined that the cache does not include the CHF associated with the CHF group ID (block 630—NO), an NRF discovery process may be performed to identify a CHF associated with the CHF group ID (block 660). For example, AMF 220, SMF 240, and/or PCF 254 may send a discovery request to NRF 258 for instances of CHF 256 associated with the CHF group ID, and NRF 258 may provide information identifying one or more instances of CHF 256 satisfying the request. Information identifying the CHF instance may be stored in the cache (block 670) and messages associated with the request may be sent to the selected CHF (block 680). For example, AMF 220, SMF 240, and/or PCF 254 may store the information received from NRF 258 in cache 530 and set a timer for the entry. AMF 220, SMF 240, and/or PCF 254 may then use the selected CHF 256 for messages associated with the request.

Figure 7:
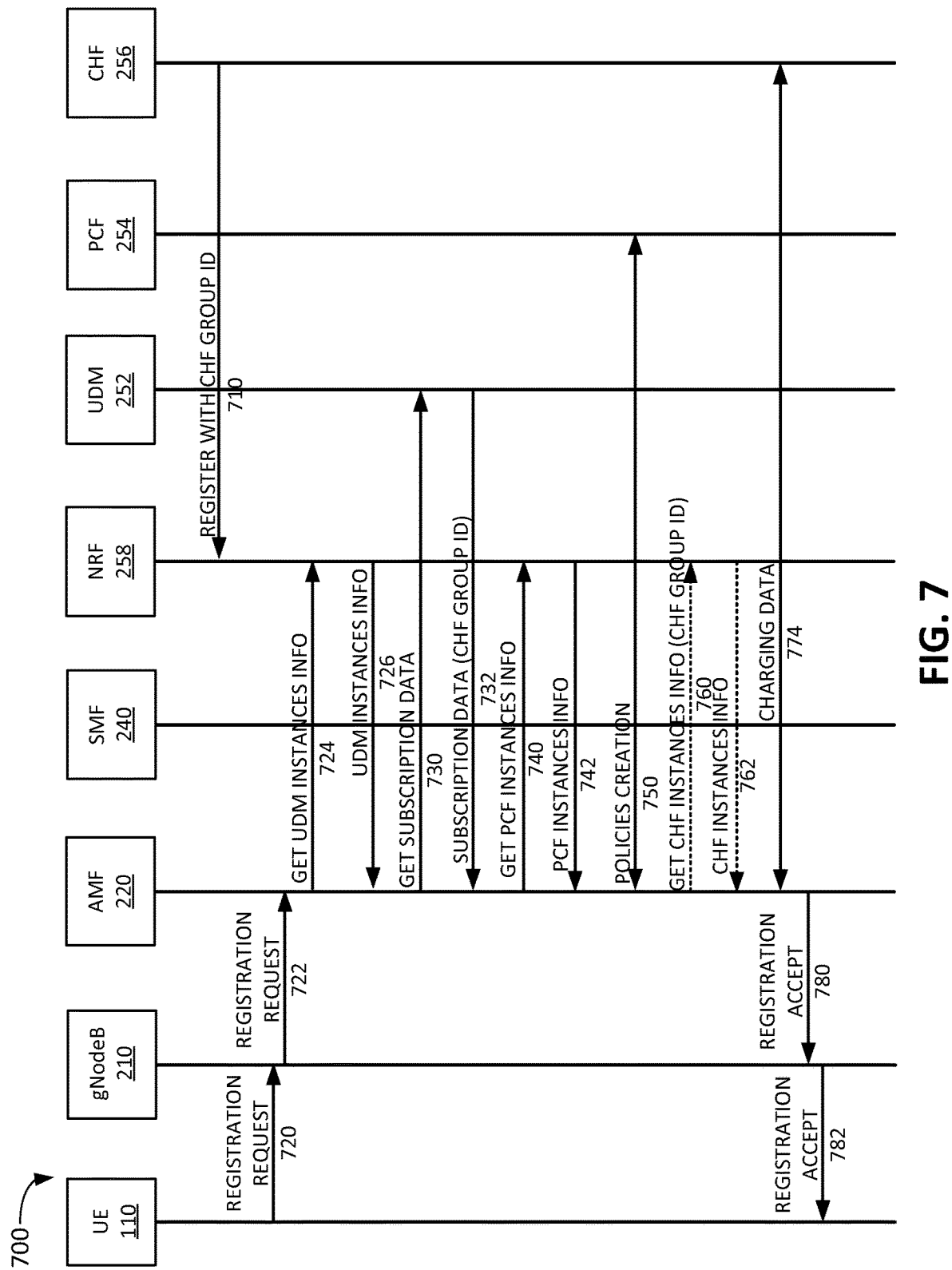
FIG. 7 illustrates an exemplary signal flow according to an implementation described herein.

FIG. 7 illustrates an exemplary signal flow 700 according to an implementation described herein. Signal flow 700 includes signals to process a registration request from UE device 110. As shown in FIG. 7, signal flow 700 may include CHF 256 sending a registration message to NRF 258 (signal 710). The registration message may include a CHF group ID associated with CHF 256.

At a later time, UE device 110 may send a registration request to AMF 220 via gNodeB 210 (signals 720 and 722) when UE device 110 seeks to attach to core network 150. In response, AMF 220 may request information identifying instances of UDM 252 from NRF 258 (signal 724) and NRF 258 may provide a list of one or more instances of UDM 252 to AMF 220 (signal 726). AMF 220 may select an instance of UDM 252 (e.g., the geographically closest instance, etc.) and request subscription data for UE device 110 from the selected UDM 252 (signal 730). UDM 252 may provide the subscription data to AMF 220 (signal 732). The subscription data may include the CHF group ID for UE device 110.

AMF 220 may then request information identifying instances of PCF 254 from NRF 258 (signal 740) and NRF 258 may provide a list of one or more instances of PCF 254 to AMF 220 (signal 742). AMF 220 may select an instance of PCF 254 (e.g., the geographically closest instance, etc.) and request creation of policies for UE device 110 with PCF 254 (signal 750). AMF 220 may then access cache 530 to determine whether cache 530 includes an unexpired entry for an instance of CHF 256 associated with the CHF group ID for UE device 110.

If the unexpired entry does not exist, AMF 220 may perform NRF discovery by requesting information identifying for instances of CHF 256 from NRF 258 (signal 760) and NRF 258 may provide a list of one or more instances of CHF 256 to AMF 220 (signal 762). The information received from NRF 258 relating to CHF 256 instance may include a CHF group ID corresponding to each CHF 256 instance. AMF 220 may select an instance of CHF 256 that is associated with the CHF group ID for UE device 110 and perform an account authentication and authorization process to authenticate and authorize UE device 110 (signal 774). If the unexpired entry exists, AMF 220 may communicate with an instance of CHF 256 from the unexpired entry to perform an account authentication and authorization process to authenticate and authorize UE device 110 without having to perform NRF discovery (signal 774). AMF 220 may then inform UE device 110, via gNodeB 210, that the registration has been accepted and completed (signals 780 and 782).

Figure 8A:
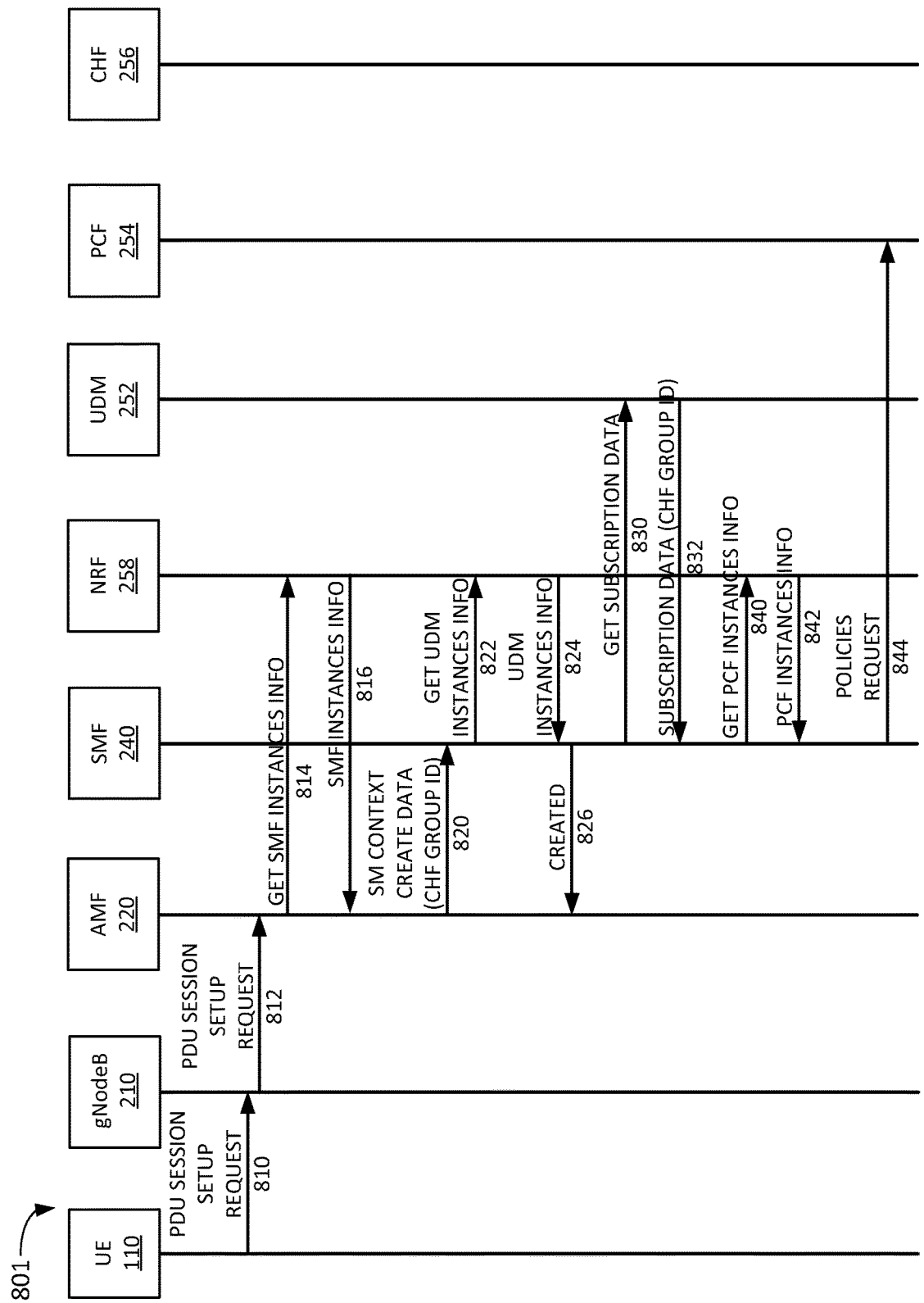
FIGS. 8A and 8B illustrate another exemplary signal flow according to an implementation described herein.
Figure 8B:
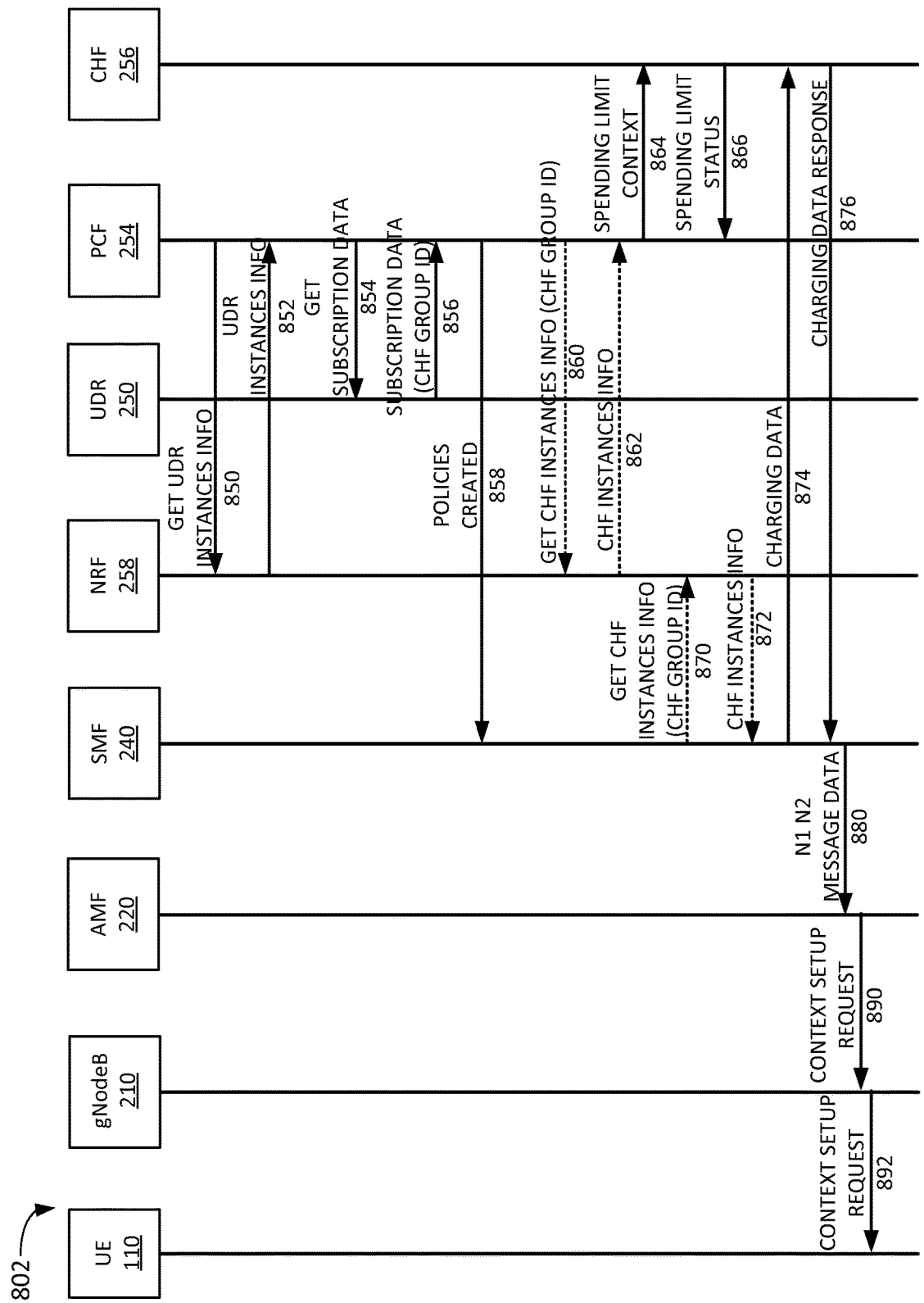

FIGS. 8A and 8B illustrates other exemplary signal flows 801 and 802 according to an implementation described herein. Signal flows 801 and 802 includes signals to process a PDU session setup request from UE device 110, after UE device 110 has registered with core network 150. As shown in FIG. 8A, signal flow 801 may include UE device 110 sending a PDU session setup request to AMF 220 via gNodeB 210 (signals 810 and 812) when UE device 110 seeks to establish a new PDU session. In response, AMF 220 may request information identifying instances of SMF 240 from NRF 258 (signal 814) and NRF 258 may provide a list of one or more instances of SMF 240 to AMF 220 (signal 816).

AMF 220 may then send a session management (SM) context create data request to SMF 240 (signal 820). The SM context create data request may include the CHF group ID associated with UE device 110. SMF 240 may then request information identifying instances of UDM 252 from NRF 258 (signal 822) and NRF 258 may provide a list of one or more instances of UDM 252 to SMF 240 (signal 824). SMF 240 may select an instance of UDM 252 (e.g., the geographically closest instance, etc.) and request subscription data for UE device 110 (signal 830). UDM 252 may provide the subscription data to SMF 240 (signal 832). The subscription data may include the CHF group ID for UE device 110.

SMF 240 may then request information identifying instances of PCF 254 from NRF 258 (signal 840) and NRF 258 may provide a list of one or more instances of PCF 254 to SMF 240 (signal 842). SMF 240 may select an instance of PCF 254 (e.g., the geographically closest instance, etc.) and send a policies request for UE device 110 to PCF 254 (signal 844).

Continuing with signal flow 802 of FIG. 8B, PCF 254 may request a list of instances of UDR 250 from NRF 258 (signal 850) and NRF 258 may provide a list of one or more instances of UDR 250 to PCF 254 (signal 852). PCF 254 may select an instance of UDR 250 (e.g., the geographically closest instance, etc.) and request subscription data for UE device 110 (signal 840). UDR 250 may provide the subscription data to SMF 240 (signal 842). The subscription data may include the CHF group ID for UE device 110. PCF 254 may then send a message to SMF 240 indicating that the policies for the PDU session have been created (signal 858).

PCF 254 may access cache 530 to determine whether cache 530 includes an unexpired entry for an instance of CHF 256 associated with the CHF group ID of UE device 110. If the unexpired entry does not exist, PCF 254 may perform NRF discovery by requesting information identifying instances of CHF 256 from NRF 258 (signal 860) and NRF 258 may provide a list of one or more instances of CHF 256 to PCF 254 (signal 862). The information received from NRF 258 relating to CHF 256 instance may include a CHF group ID corresponding to each CHF 256 instance. PCF 254 may select an instance of CHF 256 that is associated with the CHF group ID for UE device 110, send a spending limit context message to CHF 256 (signal 864), and receive a spending limit status message from CHF 256 in response (signal 866). If the unexpired entry exists, PCF 254 may communicate with an instance of CHF 256 from the unexpired entry to send a spending limit context message to CHF 256 and receive a spending limit status message from CHF 256 in response (signals 864 and 866).

Similarly, SMF 240 may access cache 530 to determine whether cache 530 includes an unexpired entry for an instance of CHF 256 associated with the CHF group ID of UE device 110. If the unexpired entry does not exist, SMF 240 may perform NRF discovery by requesting a list of instances of CHF 256 from NRF 258 (signal 870) and NRF 258 may provide a list of one or more instances of CHF 256 to SMF 240 (signal 872). The information received from NRF 258 relating to CHF 256 instance may include a CHF group ID corresponding to each CHF 256 instance. SMF 240 may select an instance of CHF 256 that is associated with the CHF group ID for UE device 110, send a charging data message to CHF 256 (signal 874), and receive a charging data response message from CHF 256 in response (signal 876). If the unexpired entry exists, SMF 240 may communicate with an instance of CHF 256 from the unexpired entry to send a charging data message to CHF 256 and receive a charging data response message from CHF 256 in response (signals 874 and 876). SMF 240 may then send N1 and N2 message data to AMF 220 (signal 880) and AMF 220 may send a context setup request message to UE device 110 via gNodeB 210 to complete the setup of the PDU session (signals 890 and 892).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, and a series of signals have been described with respect to FIGS. 7, 8A, and 8B, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a computer device, a request associated with a user equipment (UE) device;
obtaining, by the computer device, subscription information associated with the UE device from a subscription management device, wherein the subscription information includes a charging function (CHF) group identifier associated with the UE device, in response to receiving the request;
selecting, by the computer device, a CHF for the UE device based on the CHF group identifier, wherein selecting the CHF for the UE device based on the CHF group identifier includes:
accessing a cache that relates CHF group identifiers to pluralities of CHF instances;
determining that the cache includes an unexpired entry for the CHF group identifier and that a Network Repository Function (NRF) discovery to select a CHF is not to be performed; and
selecting, as the CHF for the UE device, a CHF instance from a plurality of CHF instances associated with the CHF group identifier in the cache, in response to determining that the cache includes the unexpired entry for the CHF group identifier and that the NRF discovery to select the CHF is not to be performed;
sending, by the computer device, a message associated with the request to the selected CHF for the UE device;
receiving another request associated with another UE device;
determining that an entry associated with another CHF group identifier associated with the other UE device does not exist in the cache or is expired; and
performing the NRF discovery to identify a CHF associated with the other CHF group identifier, in response to determining that the entry associated with the other CHF group identifier does not exist in the cache or is expired.

2. The method of claim 1, further comprising:
obtaining subscription information associated with the other UE device from the subscription management device, wherein the subscription information includes the other CHF group identifier associated with the other UE device;
accessing the cache to determine whether the entry associated with the other CHF group identifier does not exist or is expired; and
storing, in the cache, information associated with the identified CHF associated with the other CHF group identifier.

3. The method of claim 1, wherein the request associated with the UE device includes a registration request, and wherein the request is received by an Access and Mobility Function (AMF).

4. The method of claim 1, wherein the request associated with the UE device includes a Packet Data Unit (PDU) session establishment request, and wherein the request is received by a Session Management Function (SMF).

5. The method of claim 1, wherein the request associated with the UE device includes a Packet Data Unit (PDU) session establishment request, and wherein the request is received by a Policy Control Function (PCF).

6. The method of claim 1, further comprising:
providing the CHF group identifier associated with the UE device to a Unified Data Management (UDM) function or a User Data Repository (UDR) during a subscription activation process for the UE device.

7. The method of claim 1, wherein the CHF group identifier is based on at least one of:
a provider of wireless communication services associated with the UE device;
a subscription type associated with the UE device;
a customer account associated with the UE device; or
a location associated with the UE device.

8. A computer device comprising:
a processor configured to:
receive a request associated with a user equipment (UE) device;
obtain subscription information associated with the UE device from a subscription management device, wherein the subscription information includes a charging function (CHF) group identifier associated with the UE device, in response to receiving the request;
select a CHF for the UE device based on the CHF group identifier, wherein when selecting the CHF for the UE device based on the CHF group identifier, the processor is configured to:
access a cache that relates CHF group identifiers to pluralities of CHF instances;
determine that the cache includes an unexpired entry for the CHF group identifier and that a Network Repository Function (NRF) discovery to select a CHF is not to be performed; and
select, as the CHF for the UE device, a CHF instance from a plurality of CHF instances associated with the CHF group identifier in the cache, in response to determining that the cache includes the unexpired entry for the CHF group identifier and that the NRF discovery to select the CHF is not to be performed;
send a message associated with the request to the selected CHF for the UE device;
receive another request associated with another UE device;
determine that an entry associated with another CHF group identifier associated with the other UE device does not exist in the cache or is expired; and
perform the NRF discovery to identify a CHF associated with the other CHF group identifier, in response to determining that the entry associated with the other CHF group identifier does not exist in the cache or is expired.

9. The computer device of claim 8, wherein the processor is further configured to:
obtain subscription information associated with the other UE device from the subscription management device, wherein the subscription information includes the other CHF group identifier associated with the other UE device; and
access the cache to determine whether the entry associated with the other CHF group identifier does not exist or is expired; and
store, in the cache, information associated with the identified CHF associated with the other CHF group identifier.

10. The computer device of claim 8, wherein the request associated with the UE device includes a registration request, and wherein the request is received by an Access and Mobility Function (AMF).

11. The computer device of claim 8, wherein the request associated with the UE device includes a Packet Data Unit (PDU) session establishment request, and wherein the request is received by a Session Management Function (SMF).

12. The computer device of claim 8, wherein the request associated with the UE device includes a Packet Data Unit (PDU) session establishment request, and wherein the request is received by a Policy Control Function (PCF).

13. The computer device of claim 8, wherein the CHF group identifier is based on at least one of:
 a provider of wireless communication services associated with the UE device;
 a subscription type associated with the UE device;
 a customer account associated with the UE device; or
 a location associated with the UE device.

14. A system comprising:
 a first device configured to:
  implement a Unified Data Management (UDM) function or a User Data Repository (UDR) that stores subscription information for user equipment (UE) devices; and
 a second device configured to:
  receive a request associated with a user equipment (UE) device;
  obtain subscription information associated with the UE device from the UDM function or the UDR, wherein the subscription information includes a charging function (CHF) group identifier associated with the UE device, in response to receiving the request;
  select a CHF for the UE device based on the CHF group identifier, wherein when selecting the CHF for the UE device based on the CHF group identifier, the processor is configured to:
   access a cache that relates CHF group identifiers to pluralities of CHF instances;
   determine that the cache includes an unexpired entry for the CHF group identifier and that a Network Repository Function (NRF) discovery to select a CHF is not to be performed; and
   select, as the CHF for the UE device, a CHF instance from a plurality of CHF instances associated with the CHF group identifier in the cache, in response to determining that the cache includes the unexpired entry for the CHF group identifier and that the NRF discovery to select the CHF is not to be performed;
  send a message associated with the request to the selected CHF for the UE device;
  receive another request associated with another UE device;
  determine that an entry associated with another CHF group identifier associated with the other UE device does not exist in the cache or is expired; and
  perform the NRF discovery to identify a CHF associated with the other CHF group identifier, in response to determining that the entry associated with the other CHF group identifier does not exist in the cache or is expired.

15. The system of claim 14, wherein the second device is further configured to:
 obtain subscription information associated with the other UE device from the subscription management device, wherein the subscription information includes the other CHF group identifier associated with the other UE device;
 access the cache to determine whether the entry associated with the other CHF group identifier does not exist or is expired; and
 store, in the cache, information associated with the identified CHF associated with the other CHF group identifier.

16. The system of claim 14, wherein the first device is further configured to:
 obtain the CHF group identifier associated with the UE device during a subscription activation process for the UE device.

17. The system of claim 14, wherein the second device includes at least one of:
 an Access and Mobility Function (AMF),
 a Session Management Function (SMF), or
 a Policy Control Function (PCF).

18. The system of claim 14, wherein the CHF group identifier is based on at least one of:
 a provider of wireless communication services associated with the UE device;
 a subscription type associated with the UE device;
 a customer account associated with the UE device; or
 a location associated with the UE device.

19. The system of claim 14, wherein the request associated with the UE device includes a registration request.

20. The system of claim 14, wherein the request associated with the UE device includes a Packet Data Unit (PDU) session establishment request.

* * * * *